United States Patent Office 3,192,940
Patented July 6, 1965

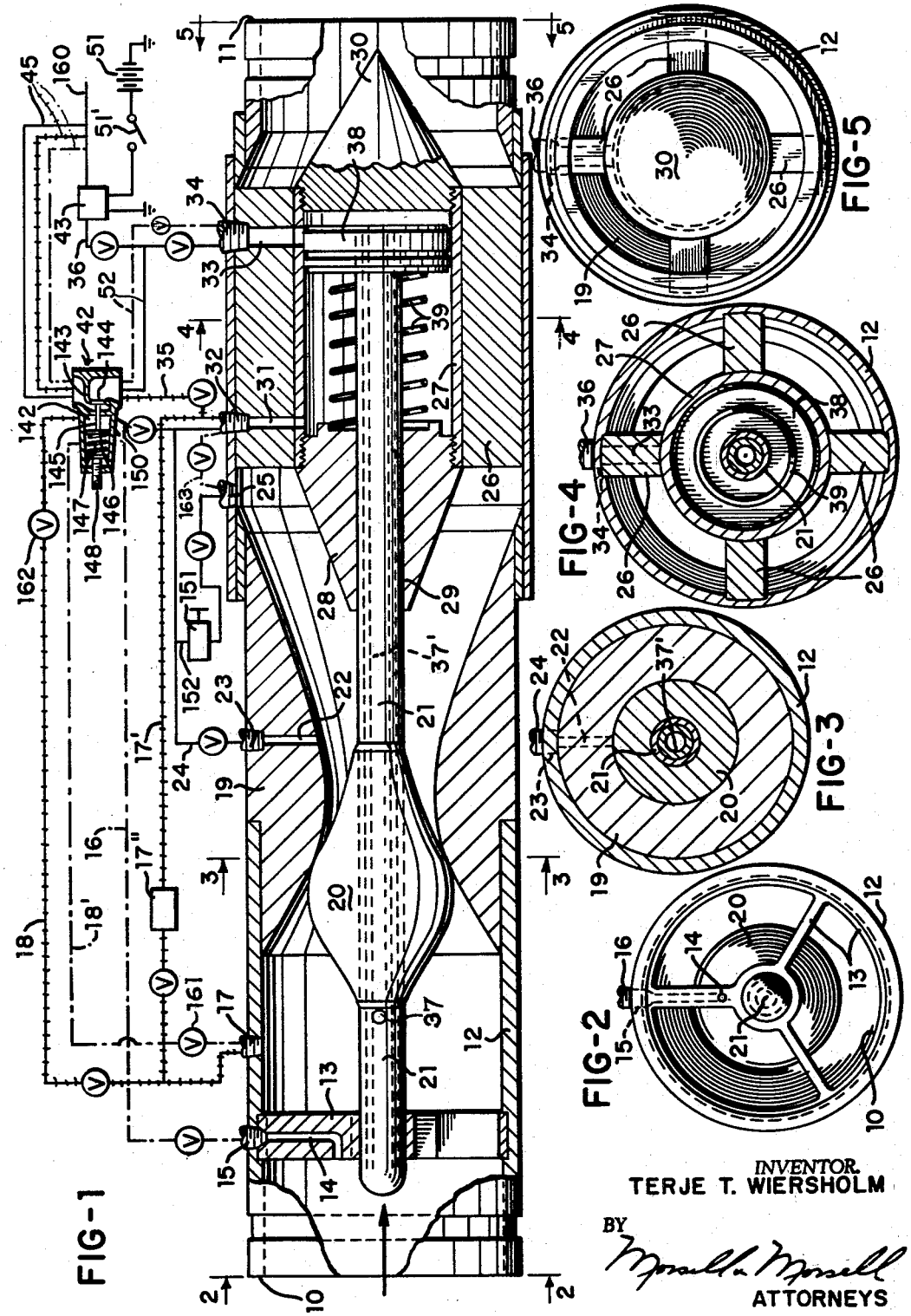

3,192,940
FLUID CONTROL VALVES
Terje T. Wiersholm, Milwaukee, Wis., assignor to The Heil Co., Milwaukee, Wis., a corporation of Wisconsin
Filed Jan. 7, 1963, Ser. No. 249,636
4 Claims. (Cl. 137—220)

This invention relates to improvements in fluid control valves, and more particularly to a novel flow and pressure control valve suitable for a variety of uses such as for use in fuel delivery tank trucks or the like. This application is a continuation-in-part of my application, Serial No. 159,110, filed December 13, 1961.

In filling aircraft fuel tanks and other receptacles with fluid using a closed fueling system, where the fuel supply line is tightly connected to the inlet of the aircraft fuel system, commonly called the single point fueling nozzle method, it is important to prevent excessive pressures from being impressed on the fuel tank(s) and attendant piping in the aircraft. Many aircraft have multiple cells containing the fuel. These fuel cells will become full not necessarily at the same time. This will result in a decrease in flow rate into the aircraft as the various tanks are filled. Each aircraft manufacturer specifies a certain constant pressure to be maintained at the connection point where the single point nozzle from the refueling unit is connected to the aircraft. It can be visualized that as the flow rate into the aircraft is reduced as the tanks, one after another, become full, a higher pressure will be experienced at the connection point. This increase in pressure can only be overcome by means of controlling the pressure and thus the flow rate upstream of this point; for instance, at the refueling unit at the other end of the fueling hose, which may be fifty to one-hundred feet from the connection point with the aircraft. The present valve acts to control, from a remote upstream point, the required downstream pressure at the nozzle connection, in order to overcome the problem. Heretofore, to eliminate this hazard, various control devices have been designed in an effort to provide a more even pressure, but all of such prior devices have employed a number of complicated valve structures which are too complex and expensive to be practical for many purposes. Moreover, it has been found that such prior control devices are not always reliable.

With the above in mind, it is an object of the present invention to provide a valve which is adapted to automatically and accurately control the flow to meet conditions encountered and to ensure a smooth discharge, and which valve unit is simple and relatively inexpensive in design and construction.

A more specific object of the present invention is to provide a flow control valve unit for the purpose described, which includes means adapted to sense variations in the pressure of the fluid both upstream and downstream of said valve, and to automatically adjust the pressure differential to maintain a constant upstream pressure.

A further object of the invention is to provide a fluid control valve unit which can be advantageously employed in the control of gas flow and gas pressures in a fuel rocket or the like.

A further object is to provide a control valve unit as described which may be used to control the downstream pressure or the liquid delivery pressure, in the case of a gasoline tank truck or the like.

A further object of the invention is to provide a novel flow control valve as described which is embodied in a unitary cylindrical housing whereby it may be readily coupled in a fuel line, thereby providing a structure which is relatively inexpensive in design and construction and which simplifies installation.

A still further object of the present invention is to provide a liquid control valve as described which may be used to maintain a constant rate of flow.

A further object of the invention is to provide a valve having various ports, selected ones of which may be selectively interconnected to produce various interchangeable features.

With the above and other objects in view, which other objects and advantages will become apparent hereinafter, the present invention consists of the improved fluid control valve and all of its parts and combinations as set forth in the following specification and claims, and all equivalents thereof.

In the accompanying drawings, illustrating the preferred form of the invention, wherein like reference numerals designate the same parts in all of the views:

FIG. 1 is a side elevational view of the complete valve unit, parts thereof being broken away and shown in longitudinal section, and the control system being shown in diagrammatic form, the circuit for the constant upstream pressure control feature being indicated by -|-|-|-|-|-, the circuit for the constant downstream pressure control feature being indicated by a single line, and the circuit for the constant rate of flow feature being indicated by a dot-and-dash line;

FIG. 2 is an end view of the valve unit taken along the line 2—2 of FIG. 1;

FIG. 3 is a transverse sectional view through the valve unit taken along line 3—3 of FIG. 1;

FIG. 4 is a transverse sectional view taken along line 4—4 of FIG. 1; and

FIG. 5 is an end view of the valve taken along the line 5—5 of FIG. 1.

Referring now more particularly to the drawing, it will be seen that the valve assemblage comprising the present invention is in the form of an elongated cylindrical tube 12 having end portions 10 and 11 which are adapted to be coupled into a fluid line. In the illustrated unit the direction of flow is from left to right.

As is shown in FIGS. 1 and 2, spaced to the right a short distance from the inlet end 10 of the valve unit is a spider bracket 13 which is provided with three equally-spaced arms projecting radially inwardly from the cylindrical housing 12 and converging to form an apertured central hub. A duct 14 opens in the upstream face of one of said bracket arms and extends radially outwardly the length of said arm to communicate with a port 15 in the housing 12. As is illustrated diagrammatically in FIG. 1, a conduit 16 is suitably connected to and communicates with said port 15, the function of which line will be hereinafter described.

A second port 17 (FIG. 1) is formed in the housing 12 downstream of the aforementioned port 15, and a line 18 is connected to and communicates with said second port. With respect to said line 18, as well as the aforementioned line 16 and the other associated lines described hereinafter, all are valve-controlled as indicated by the symbol V in a circle so that selected ports may be shut off depending upon the usage to which the valve unit is to be put. Said lines are designed to transmit the pressure of the liquid or fluid as the same passes through various portions of the improved valve unit and are interconnected with the ducts 31 and 33 through the pilot valve 42. In the illustrated embodiment of the invention, some of the lines are also operatively connected to a control circuit which permits the remote opening of an exhaust line 160 leading to a reservoir or to a point downstream in the conduit being controlled. The electrical circuit is indicated by the numeral 46, the battery by 51, the solenoid valve by the numeral 43, and the on-off switch by 51'.

With reference now to FIGS. 1 and 3 of the drawing, it will be seen that the central longitudinal portion of the improved valve unit is in the form of a nozzle 19 forming a constricted throat. As shown in FIG. 1, a bulb-like plug 20, hereinafter referred to as the nozzle plug, is rigidly carried by a movable piston rod 21 adjacent the left side of said nozzle and is adapted to be moved into and out of closing engagement with the nozzle, a portion of which forms a valve seat. The outer end portion of said piston rod is slidably supported in and guided by the hub of the aforementioned spider bracket 13. A duct 22 extends radially through a downstream portion of said nozzle, the outer end of said duct communicating with a port 23 in the housing 12 and with a line 24 connected to said port. Still another port 25 is located just beyond the end of said nozzle portion (FIG. 1) and is adapted, in certain uses, to operate in conjunction with the aforementioned port 23, as will be seen.

Mounted downstream of the nozzle portion 19 is an elongated spider bracket 26 comprising a plurality of spaced radial arms rigidly supporting a piston cylinder 27, which communicate with the right-hand interior portion 28 is threaded into the left-hand end of said piston cylinder (FIG. 1), which plug is provided with a longitudinal bore 29 through which the piston rod 21 is slidably supported, and the right-hand end of said cylinder is closed by a tapered conical plug 30.

Said bracket 26 is provided with a radial duct 31 which communicates with the left-hand interior portion of said piston cylinder 27 and with a port 32 in the housing. The bracket also has a second passage 33 and port 34 which communicate with the right-hand interior portion of said piston cylinder. The latter port is connected by a valve-controlled conduit 36 to one side of a normally closed solenoid valve 43, and the port 32 communicates with the line 24 leading from the aforementioned port 23 in the nozzle. A second valve-controlled line 35 is also connected to said port 32 and leads to the pilot valve 42.

The piston rod 21 extends practically the entire length of the valve unit and is in the form of a hollow tube which is open at its right-hand end but the left-hand end of which is closed, there being an inlet aperture 37 spaced a short distance from said left hand. The right-hand end of said rod has a piston 38 mounted rigidly thereon which is adapted to fit snugly within the cylinder 27, said piston being provided with conventional seals to ensure its leakproof engagement with the inner surface of said cylinder. Mounted within said cylinder 27 in surrounding relation to said piston rod is a spring 39 to constantly urge said piston toward the right-hand end of the tube, the compression of said spring being such that the piston may be moved to the left against the compression of the spring in response to a certain predetermined pressure against the right-hand face thereof, referring to FIG. 1.

*Constant upstream pressure control feature*

In one type of operation of the novel valve assemblage, assuming that it is being used with a fueling system, the gasoline or other liquid being pumped enters the inlet end 10 and flows through the spider bracket 13, the valves controlling flow from ports 15, 23, 25 and 34 being closed. The circuit lines which are used for this operation are indicated by -|-|-|-|-|-|-. Port 17 is connected to port 32 by line 17', there being an orifice member 17" in the line 17', and the valve in said line being open. Port 17 is also connected to chamber 142 of a pilot valve 42, the valve in line 18 being open and valve 162 being open and valve 161 closed.

The pilot valve has a valve seat 143 controlled by a valve member 144 on a valve stem 145. The outer end of the valve stem is connected to a diaphragm 146 which is adapted to be urged by a coil spring 147 in a right-hand direction. The spring may be adjusted by a threaded adjustment screw 148. When the valve 144 is open, flow from the line 35 through lines 45 and 160 to the tank is permitted (the valve in line 35 being open) to relieve pressure on the left-hand side of the piston 38. By adjusting the compression of the spring, through manipulation of the adjustment screw 148 acting on the diaphragm 146, it is possible to select the sensing pressure fed through the line 18 at which the valve member 144 will move away from its seat to allow flow through the pilot valve to the tank (or in some cases, downstream of the valve 12).

When the upstream pressure increases over and above the setting of the pilot valve 42, the pilot valve will open, allowing pressure on the left-hand side of the piston 38 to be bled to the tank through lines 45 and 160 or into the conduit downstream of the valve 12. The pressure on the right-hand side of the piston 38, which is sensed through port 37 and duct 37' of the stem 21, will then move the piston assembly to the left, thus moving the plug member 20 still more and relieving the upstream pressure until the pressure set by the pilot valve 42 is obtained, at which time the valve member 144 of the pilot valve 42 will close to stop exhaust of fluid from the left-hand side of the piston 38. It should be noted that during the regulating operation the pilot valve will always be slightly open, thus continuously regulating and responding to the sensing pressure from the line 18.

If the upstream pressure is less than that selected by the adjustment of the pilot valve 42, the valve member 144 will remain closed, and the pressure acting through line 17' and port 31 on the left-hand side of the piston 38 of the main valve, plus the light compression of the spring 39, will be greater than the pressure acting on the right-hand side of the piston 38. Hence, the piston 38 will tend to move to the right to move the plug 20 toward closed position, thereby restricting the flow through the valve unit to increase the upstream pressure.

*Constant downstream pressure control*

The object of the constant downstream pressure control is to maintain a constant pressure in the pipe line a predetermined distance downstream of the valve member 12, regardless of factors upstream which might tend to create a varying flow. When carrying out this object circuit lines, which are indicated thus ——, are employed. The valves controlling flow from the ports 15 and 17 are closed and the other ports are open, ports 34 being connected to the pilot valve 42 by the line 52 and to the solenoid by a valve-controlled line 36, the valve being open. Port 32 is connected by line 150 with the chamber 142 of the pilot valve, the valve in line 150 being open, and the valve in line 35 being closed.

During flow through the main valve 12 and the associated pipe line, there will be a friction loss in the pipe line between a point which is a predetermined distance downstream, where it is desired to maintain constant pressure, and the valve member 12. This friction loss is proportional to the square of the velocity of the fluid flowing through the pipe line. During flow through the unit 12, the pressure at port 22 is appreciably less than the pressure at port 25, due to the greater velocity at port 22. This difference in pressure depends upon the difference in cross-sectional area in transverse sections taken through the valve at ports 22 and 25, respectively. This difference in pressure is called "recovery pressure," and it is desirable to have this recovery pressure equal to the friction loss. By having the proper cross-sectional area difference between the cross sections at 22 and 25, one will sense the same pressure at 22 as that which is desired at a predetermined point downstream in the piping.

In order to make the unit more versatile, it is preferred to use a needle valve 151 in the line 152 which connects the line 24 from port 23 with port 25. Thus, if the friction loss is less than the recovery pressure, the needle valve 151 can be opened slightly to reduce the recovery pressure of the valve unit. When the correct recovery pressure is established, by the adjustment of the needle valve 151, one will have a pressure sensed in line 150, acting in the chamber 142 of the pilot valve, which pressure is exactly the same as that desired at the said point in the pipe line a predetermined distance downstream of the valve unit, regardless of the amount of flow. The needle valve 151 can be eliminated if the cross-sectional area at 22 and at 25 are such, with respect to one another, that the correct recovery pressure is obtained. However, this is difficult to accomplish, so a needle valve is usually employed.

Assuming that the correct relationship is obtained, the pilot valve 42 is then adjusted by means of the screw 148 to such a degree that the desired static fluid pressure on the right-hand side of diaphragm 146 is in balance with the spring force 147. Thus, any increase in pressure which is sensed in chamber 142 of the pilot valve will slightly compress the spring 147, thus opening the valve member 144 of the pilot valve and allowing fluid to exhaust from port 34 through lines 52, 45, and 160 to the tank, or downstream of the pipe line, thus relieving pressure on the right-hand side of the piston 38 in the main valve.

In order to start up operation, the solenoid valve 43 is closed by means of the manual switch 51'. Thus, any pressure sensed through the port 37 and longitudinal duct 37' of the piston rod 21, which is communicated to the right-hand side of the piston 38, is in a condition to be controlled by the pilot valve 42, depending upon the pressure acting to move the valve member 144. If the pressure on the right-hand side of the piston 38 is greater than the pressure on the left-hand side, the piston 38 will start to move to the left to open the plug 20 and allow flow through the valve 12. The piston 38 and plug 20 will continue to thus move until the static pressure at port 22 reaches the pressure at which the pilot valve 42 is set to open. At this point the valve member 144 of the pilot valve will open slightly, bleeding pressure from the right-hand side of the piston 38 by an amount necessary to keep a constant static pressure at 22. This static pressure will be the static pressure which it is desired to maintain at the predetermined point downstream in the pipe line. Any increase in the static pressure at this predetermined point downstream will result in the same increase in static pressure at 22, which will open the pilot valve member 144 further, relieving more pressure on the right-hand side of the piston 38. This will result in movement of the piston 38 to the right, together with the plug 20, thus throttling the flow of fluid through the valve 12. This throttling will result in a decrease in the static pressure at 22 until the desired static pressure in reestablished at the predetermined point downstream as well as at 22.

Similarly, a decrease in the static pressure at the predetermined point downstream will result in the same decrease in static pressure at the sensing point 22, which will result in the pivot valve member 144 closing. Hence the pressure on the right-hand side of piston 38 will act to move the piston to the left again, opening the plug 20 to a greater extent and increasing the flow through the valve 12 until the desired pressure is sensed at 22 and 25, at which point the pilot valve member 144 will again start to open to stop the left-hand movement of the piston 38. Thus it may be seen that the improved valve unit can act to control downstream pressure within limits.

*Constant rate of flow*

In addition to the functions heretofore described, the improved valve may be used to maintain a constant rate of flow of the liquid in the line by the hookup indicated by dot-and-dash lines in FIG. 1. When thus employed, port 15 is connected by a line 16 with the chamber 142 of the pilot valve, and the valve in line 16 is opened. Port 17 is connected by the line 18' with the chamber for the spring 147 in the pilot valve 42, hand valve 161 being opened and hand valve 162 being closed. The valves controlling flow in lines 35, 150, and 152 are closed, and ports 25 and 32 are interconnected by opening the valve in line 163, all other lines communicating with ports 25 and 32 being closed. In addition, the valve controlling flow from port 34 is open to allow communication between said port and the pilot valve 42 and the valve in line 36 is closed.

For any desired flow through the valve there is a given pressure drop across ports 15 and 17, the high portion of which is sensed in line 16 and communicated to chamber 142 of the pilot valve 42. The low portion is sensed and communicated through lines 18 and 161 to the spring chamber of the pilot valve 42, valve 162 being closed. By adjusting the screw 148 of the pilot valve for the flow required, the valve will tend to regulate as follows: A slight increase in flow through the valve 12 will create an increase in the pressure differential between 15 and 17, which will act to force the valve member 144 of the pilot valve away from its seat, to allow exhaust of pressure through line 52 from the right-hand side of the piston 38. This will cause the piston to move to the right, thus reducing flow through the valve 12 until the given pressure differential, corresponding to the desired flow, is obtained. A slight decrease in the flow through the valve 12 will create a decrease in the pressure differential developed between 15 and 17, which will force the pilot valve 144 tightly against its seat and will prevent exhausting of pressure from the right-hand side of the piston 38 of the main valve. Thus, the piston 38 and plug 20 will move to the left to increase the flow through the valve 12 until the given pressure differential, corresponding to the desired flow, is obtained.

In summary, the present invention provides a control valve which has general usage but which is particularly useful in connection with fuel delivery trucks to automatically control either pressure or the flow velocity of the fluid with great accuracy and reliability.

It is to be understood that the improved control unit is not to be limited or confined to the exact structural details illustrated and described herein. Obvious changes and modifications in the individual components will suggest themselves to persons skilled in the art, and all of such changes or modifications are contemplaed which do not depart from the spirit of the invention and which may come within the scope of the following claims.

What I claim is:

1. A control valve for use in a fluid conduit comprising: a tubular body having an intermediate Venturi throat forming a valve seat, a valve stem supported axially of the tubular body for slidable movement and extending through said throat, a plug carried by said stem on the upstream side of said throat, a piston carried by said stem on the downstream side of said throat, a cylinder for said piston providing fluid pressure chambers on both the upstream and downstream sides of the piston, means supporting said cylinder in the body while permitting substantially straight flow through the body around said cylinder, pressure sensing means for transmitting upstream pressure to said fluid pressure chamber of the cylinder on the downstream side of the piston to urge the plug away from the throat, means affording communication between a portion of the valve body downstream of said plug and said fluid chamber of the cylinder on the upstream side of the piston for transmitting pressure to urge the plug toward the throat, a fluid discharge line in communication with said cylinder on the downstream side of said piston, a pilot valve in said discharge line having a valve member controlling the bleeding of fluid from said cylinder through said discharge line and having pressure responsive means for moving said valve member, and pressure sensing means communicating at one end with said pressure responsive means of the pilot valve and having spaced branches at its opposite end, one of which connects with a restricted portion of the Venturi throat downstream of the plug and adjacent thereto and the other of which connects farther downstream in the valve body between the plug and said cylinder, and a needle valve in said last mentioned branch, said needle valve being so adjustable and the points of connection of said branches with the valve body being so located with respect to the Venturi throat and with respect to each other that the difference in pressure at the two points of connection is equal to the friction loss downstream of the valve, whereby the sensed pressure acting upon the pilot valve is substantially the same as the pressure which it is desired to maintain in the fluid conduit a predetermined remote distance downstream of the valve unit regardless of the amount of flow.

2. A control valve as claimed in claim 1 in which there is a spring in the cylinder positioned to act on the piston in a direction to aid movement of the plug in a closing direction.

3. A control valve as claimed in claim 1 in which the pressure responsive means of the pilot valve is adjustable.

4. A control valve as set forth in claim 1 in which the valve stem is tubular and in which the pressure sensing means for transmitting upstream pressure to the fluid pressure chamber of the cylinder is through said tubular valve stem.

References Cited by the Examiner
UNITED STATES PATENTS

| | | | |
|---|---|---|---|
| 1,098,616 | 6/14 | Creveling | 137—489 |
| 1,965,307 | 7/34 | Darling | 137—491 XR |
| 1,987,819 | 1/35 | Foulds | 137—220 XR |
| 2,725,891 | 12/55 | Bourguignon et al. | 137—219 |
| 3,013,432 | 12/61 | O'Keeffe | 73—213 |

FOREIGN PATENTS 1,728    1898    Great Britain.

M. CARY NELSON, *Primary Examiner.*

MARTIN P. SCHWADRON, *Examiner.*